(12) United States Patent
Seneger et al.

(10) Patent No.: US 11,373,374 B2
(45) Date of Patent: Jun. 28, 2022

(54) ALIGNING THE AUGMENTED REALITY OR VIRTUAL REALITY WORLD WITH THE REAL WORLD USING NATURAL POSITION UNDERSTANDING

(71) Applicant: Volvo Car Corporation, Gothenburg (SE)

(72) Inventors: Jon Seneger, Boulder Creek, CA (US); Qinzi Tan, San Jose, CA (US); Lukasz Pasek, Sunnyvale, CA (US)

(73) Assignee: Volvo Car Corporation, Gothenburg (SE)

( * ) Notice: Subject to any disclaimer, the term of this patent is extended or adjusted under 35 U.S.C. 154(b) by 84 days.

(21) Appl. No.: 16/676,830

(22) Filed: Nov. 7, 2019

(65) Prior Publication Data

US 2021/0142567 A1 May 13, 2021

(51) Int. Cl.
*G06T 19/00* (2011.01)
*G10H 5/00* (2006.01)
*G06F 3/01* (2006.01)
*G02B 27/01* (2006.01)
*G06T 19/20* (2011.01)
*G06F 3/04815* (2022.01)
*G06V 20/20* (2022.01)

(52) U.S. Cl.
CPC ......... *G06T 19/006* (2013.01); *G02B 27/017* (2013.01); *G06F 3/011* (2013.01); *G06F 3/017* (2013.01); *G06F 3/04815* (2013.01); *G06T 19/20* (2013.01); *G06V 20/20* (2022.01); *G10H 5/007* (2013.01); *A63F 2300/8082* (2013.01)

(58) Field of Classification Search
None
See application file for complete search history.

(56) References Cited

U.S. PATENT DOCUMENTS

| | | | |
|---|---|---|---|
| 9,454,849 B2 | 9/2016 | Mount et al. | |
| 9,667,873 B2 | 5/2017 | Mulloni et al. | |
| 9,728,010 B2 | 8/2017 | Thomas et al. | |
| 9,884,248 B2 * | 2/2018 | Koseki | G06F 3/167 |
| 10,078,377 B2 | 9/2018 | Balan et al. | |
| 10,126,553 B2 * | 11/2018 | Poulos | G02B 27/0103 |
| 2004/0130579 A1 * | 7/2004 | Ishii | G06F 3/011 |
| | | | 715/848 |
| 2015/0123966 A1 * | 5/2015 | Newman | G06T 19/006 |
| | | | 345/419 |
| 2016/0180590 A1 * | 6/2016 | Kamhi | G06K 9/00671 |
| | | | 345/633 |
| 2016/0199730 A1 * | 7/2016 | Olson | A63F 13/216 |
| | | | 463/31 |

(Continued)

*Primary Examiner* — Jwalant Amin
(74) *Attorney, Agent, or Firm* — Clements Bernard Walker; Christopher L. Bernard (57) ABSTRACT

A method and system for selecting an instantiation point for a virtual asset relative to a physical space, the method including and system operable for: prompting a user to place a device at a desired position/alignment in the physical space; capturing the position/alignment with respect to a real world frame of reference; translating the position/alignment with respect to the real world frame of reference to a frame of reference in virtual space; and spawning the virtual asset in the virtual space at/with the translated position/alignment. The device includes one of a smartphone with a camera and a 6 degree-of-freedom controller.

20 Claims, 4 Drawing Sheets

(56) References Cited

U.S. PATENT DOCUMENTS

| | | | |
|---|---|---|---|
| 2017/0031502 A1* | 2/2017 | Rosenberg | G06F 3/0346 |
| 2017/0084051 A1 | 5/2017 | Weising et al. | |
| 2017/0123750 A1* | 5/2017 | Todasco | G06F 21/10 |
| 2017/0354843 A1* | 12/2017 | Vuillerme | G09B 5/04 |
| 2018/0218538 A1* | 8/2018 | Short | G06F 3/04815 |
| 2018/0275744 A1* | 9/2018 | Kingsbury | G06F 3/0482 |
| 2019/0087019 A1* | 3/2019 | Raja | G06F 3/012 |
| 2019/0087068 A1* | 3/2019 | Noguchi | G06F 3/04815 |
| 2019/0235641 A1* | 8/2019 | Goldberg | G08C 23/04 |

* cited by examiner

ALIGNING THE AUGMENTED REALITY OR VIRTUAL REALITY WORLD WITH THE REAL WORLD USING NATURAL POSITION UNDERSTANDING

TECHNICAL FIELD

The present disclosure relates generally to augmented reality (AR) and virtual reality (VR) methods and systems. More particularly, the present disclosure relates to methods and systems for aligning the AR or VR world with the real world using natural position understanding. These methods and systems may be applied in automotive and other contexts.

BACKGROUND

When placing a user within a virtual space, using a smartphone, VR headset, or the like, determining the user's placement within the virtual space is a significant obstacle to be overcome. Proper user alignment at spawning and thereafter enables a user to trust the virtual space and fully interact with it.

Figure 1:
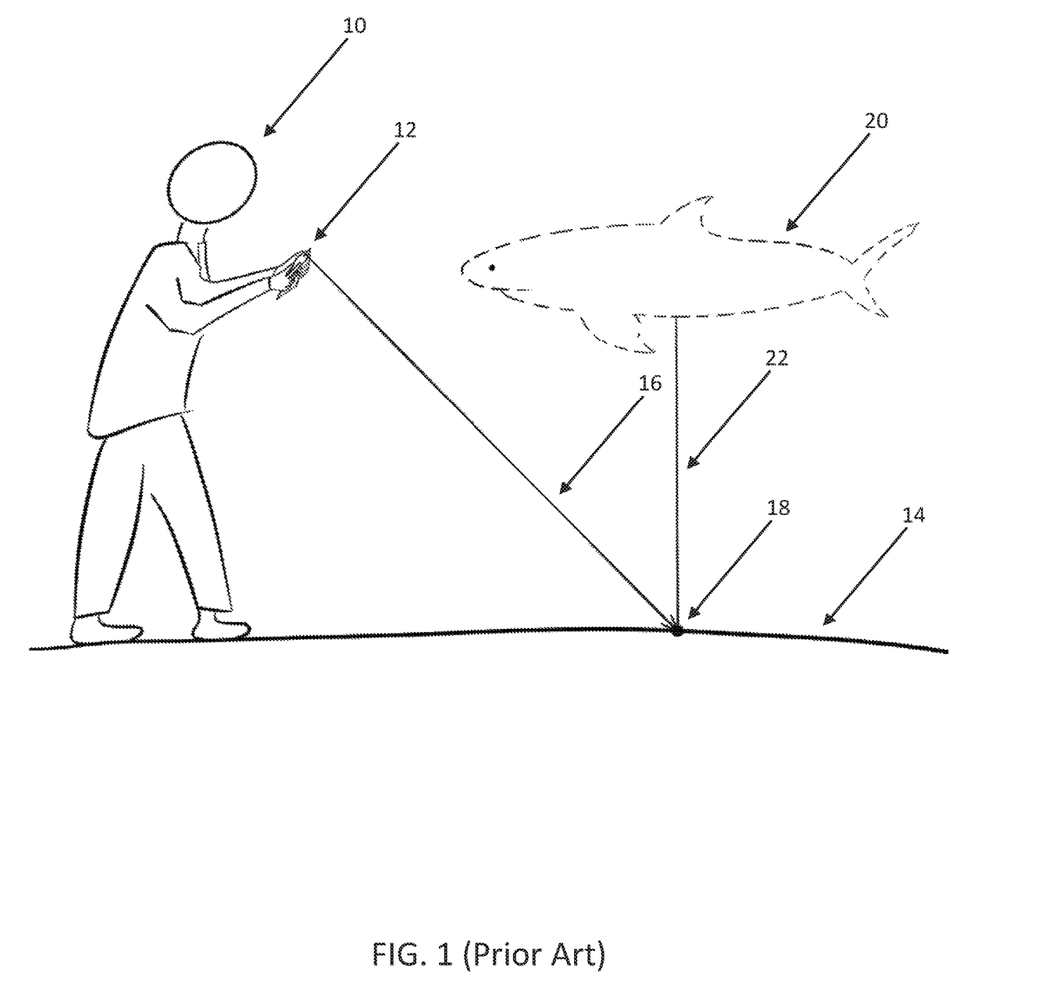
FIG. 1 is a schematic diagram illustrating the operation of a conventional ray casting method for aligning a virtual world with the real world and placing the instantiation point for a virtual asset using a smartphone.

The most common conventional method of aligning an AR or VR world with the real world is via plane detection, as illustrated in FIG. 1. Here, the user 10 is equipped with a smartphone 12 that includes a camera and executes an application (app) that is capable of recognizing a plane 14, such as the ground or an edge of a given surface, whether horizontal or vertical. For example, the app may execute an artificial intelligence (AI) algorithm to recognize the ground. The position and alignment of this plane 14 relative to the smartphone 12, and the user 10, is thus known. The app then casts a ray 16 from the smartphone 12 to a point 18 (or anchor or pivot point) on the plane 14. A virtual object 20 may then be coupled to the plane 14 at this point 18, or tethered adjacent to the point 18 in the virtual space via a virtual tether 22 (or pivot line). Subsequently, this spatial relationship may be maintained as the virtual world shifts, with the plane 14, point 18, and/or virtual tether 22 providing a dynamic frame of reference. A similar methodology may be employed using a VR headset or the like, provided that the plane 18 may be recognized and the ray 16 cast to define the point 18 acting as the anchor or pivot.

Disadvantageously, this methodology is not intuitive and the ray 16 may not always be accurately cast. The user 10 must essentially "shoot" a spot where (or with respect to which) he or she would like a virtual object to spawn. It would be more intuitive to allow the user 10 to indicate a position at which he or she would expect to "touch" the virtual object, for example. Thus, what are still needed in the art are methods and systems that allow the user to better align the AR or VR world with the real world using such a natural position understanding.

SUMMARY

The present disclosure utilizes existing AR/VR technologies, three-dimensional (3D) development platforms, and 3D asset creation tools to establish a spatial correlation between the real world, the virtual world, and one or more virtual assets, especially at spawning, but subsequently as well. The present disclosure exploits the capabilities of an AR-enabled smartphone or other smart device, 6 degree-of-freedom (6DoF) (or other) controller associated with a VR headset, or the like. A user is prompted to select an instantiation point for a virtual asset using the device, essentially using it like a virtual 3D cursor—selecting where the virtual asset and surrounding virtual assets are spawned. The initial transformed relationships can then be maintained throughout the user's immersive experience. As a result, a personalized immersive environment and experiences can be provided with proper spatial orientation relative to the user—all taking advantage of the user's natural position understanding.

In one exemplary embodiment, the present disclosure provides a method of selecting an instantiation point for a virtual asset relative to a physical space, the method including: prompting a user to place a device at a desired position in the physical space; capturing the position with respect to a real world frame of reference; translating the position with respect to the real world frame of reference to a frame of reference in virtual space; and spawning the virtual asset in the virtual space at the translated position. Optionally, the method further includes: prompting the user to place the device at the desired position in the physical space in a desired alignment; capturing the position and alignment with respect to the real world frame of reference; translating the position and alignment with respect to the real world frame of reference to the frame of reference in virtual space; and spawning the virtual asset in the virtual space at the translated position and alignment. The device includes one of a smartphone with a camera and a 6 degree-of-freedom controller. The prompting is performed by one of a mobile application executed on the smartphone and an application executed on a virtual headset. The capturing, translating, and spawning are performed by one or more of a mobile application executed on the smartphone, an application executed on a virtual headset, and a processor coupled to the device. Optionally, capturing the position with respect to the real world frame of reference includes taking a plurality of position measurements over a predetermined period of time and filtering the plurality of position measurements to obtain a final position measurement. Optionally, capturing the position with respect to the real world frame of reference includes taking a plurality of position measurements over a predetermined period of time and averaging the plurality of position measurements to obtain a final position measurement. Optionally, the method further includes spawning one or more virtual assets around the virtual asset in the virtual space.

In another exemplary embodiment, the present disclosure provides a non-transitory computer-readable medium stored in a memory and executed by a processor to select an instantiation point for a virtual asset relative to a physical space, the non-transitory computer-readable medium executing the steps including: prompting a user to place a device at a desired position in the physical space; capturing the position with respect to a real world frame of reference; translating the position with respect to the real world frame of reference to a frame of reference in virtual space; and spawning the virtual asset in the virtual space at the translated position. Optionally, the steps further include: prompting the user to place the device at the desired position in the physical space in a desired alignment; capturing the position and alignment with respect to the real world frame of reference; translating the position and alignment with respect to the real world frame of reference to the frame of reference in virtual space; and spawning the virtual asset in the virtual space at the translated position and alignment. The device includes one of a smartphone with a camera and a 6 degree-of-freedom controller. The prompting is performed by one of a mobile application executed on the smartphone and an application executed on a virtual headset.

The capturing, translating, and spawning are performed by one or more of a mobile application executed on the smartphone, an application executed on a virtual headset, and a processor coupled to the device. Optionally, capturing the position with respect to the real world frame of reference includes taking a plurality of position measurements over a predetermined period of time and filtering the plurality of position measurements to obtain a final position measurement. Optionally, capturing the position with respect to the real world frame of reference includes taking a plurality of position measurements over a predetermined period of time and averaging the plurality of position measurements to obtain a final position measurement. Optionally, the steps further include spawning one or more virtual assets around the virtual asset in the virtual space.

In a further exemplary embodiment, the present disclosure provides a system for selecting an instantiation point for a virtual asset relative to a physical space, the system including: a device executing an application operable for prompting a user to place the device or a coupled device at a desired position in the physical space; wherein the application is further operable for capturing the position with respect to a real world frame of reference; wherein the application is further operable for translating the position with respect to the real world frame of reference to a frame of reference in virtual space; and wherein the application is further operable for spawning the virtual asset in the virtual space at the translated position. Optionally, the application is further operable for: prompting the user to place the device at the desired position in the physical space in a desired alignment; capturing the position and alignment with respect to the real world frame of reference; translating the position and alignment with respect to the real world frame of reference to the frame of reference in virtual space; and spawning the virtual asset in the virtual space at the translated position and alignment.

BRIEF DESCRIPTION OF THE DRAWINGS

The present disclosure is illustrated and described with reference to the various drawings in which like reference numbers are used to denote like system components/method steps, as appropriate, and in which.

DESCRIPTION OF EMBODIMENTS

The present disclosure utilizes existing AR/VR technologies, 3D development platforms, and 3D asset creation tools to establish a spatial correlation between the real world, the virtual world, and one or more virtual assets, especially at spawning, but subsequently as well. The present disclosure exploits the capabilities of an AR-enabled smartphone or other smart device, 6DoF (or other) controller associated with a VR headset, or the like. A user is prompted to select an instantiation point for a virtual asset using the device, essentially using it like a virtual 3D cursor—selecting where the virtual asset and surrounding virtual assets are spawned. The initial transformed relationships can then be maintained throughout the user's immersive experience. As a result, a personalized immersive environment and experiences can be provided with proper spatial orientation relative to the user—all taking advantage of the user's natural position understanding. Specifically, intuitive spawning is enabled, with accurate placement based on a user's natural position understanding and intention.

The AR/VR technologies that are exploited to use the AR-enabled smartphone, 6DoF controller, or the like to select a spawning point for a virtual asset include those that use the smartphone's camera, for example, to add interactive elements to an image or video of a real world environment, which can be viewed through the hardware layer. Such tools are well known to persons of ordinary skill in the art and typically require no special hardware to operate. They include, for example, ARCore™ by Google LLC, ARKit™ by Apple Inc., and ARFoundation. These tools generally allow a developer to add things like advanced motion tracking to an app, allowing a device to better understand its relationship to an environment. The device is enabled to judge the size and position of objects in the environment, etc., and track its relative position as it moves, allowing for a deeper understanding of the real world. Horizontal and vertical planes can be detected and utilized, as well as reference points, point clouds, and light estimation. Similarly, well known 6DoF controller packages and immersive headset technologies with 6DoF control may also be utilized (available from a variety of manufacturers), sensing and utilizing motion and control in forward-backward, side-to-side, and up-down directions and about roll, pitch, and yaw axes.

The 3D platforms that are used to track transform data from the AR-enabled phone, 6DoF controller, or the like in relation to an established virtual coordinate system include various game development engines and the like, such as Unity3D™ by Unity IPR APS and Unreal™ by Epic Games, Inc. that allow 3D environments to be generated and interacted with. The 3D asset creation tools that are utilized include the VR-Plugin for Maya™ by Autodesk Inc. and Blender, among others, all of which are used to create 3D objects in virtual space.

Figure 2:
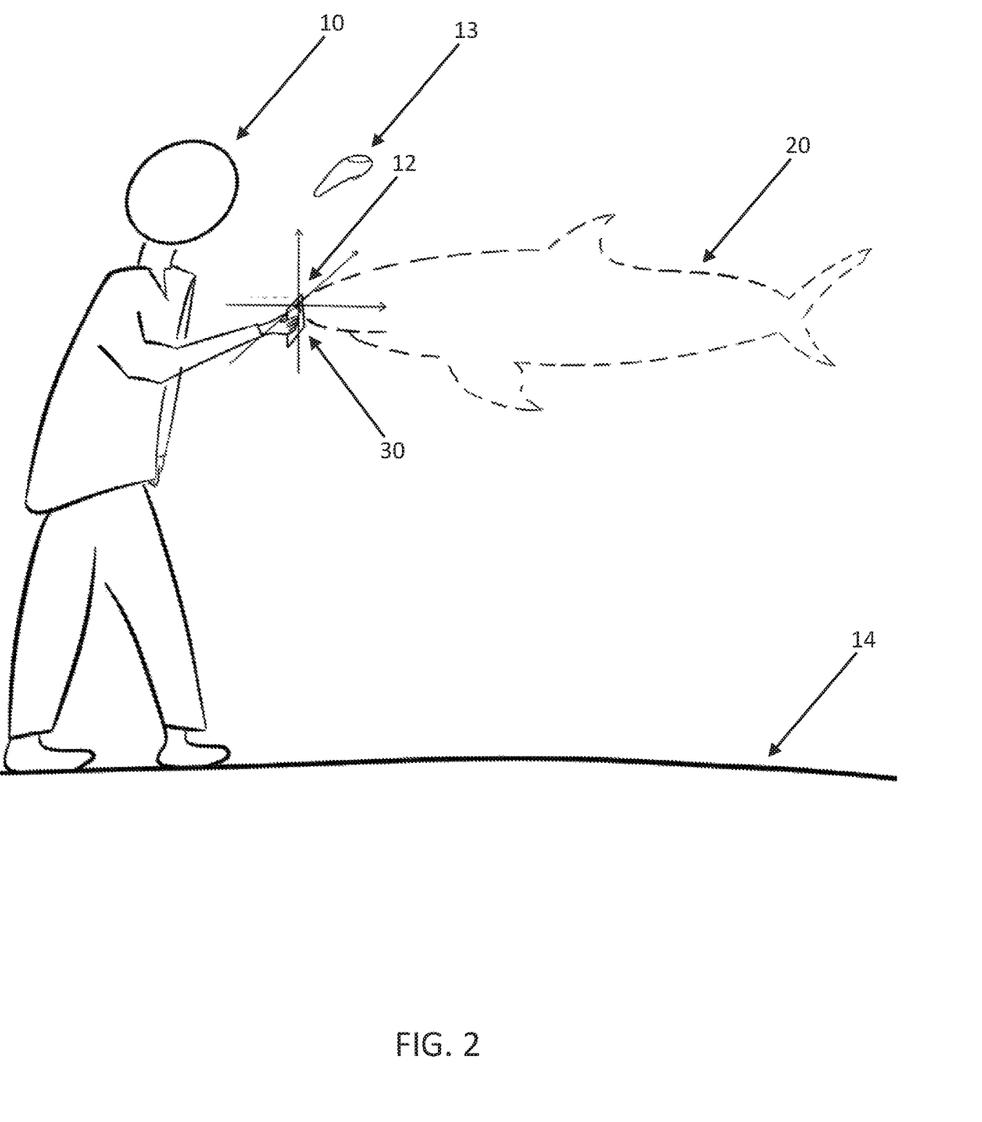
FIG. 2 is a schematic diagram illustrating the operation of one exemplary embodiment of the AR/VR app of the present disclosure, highlighting the use of a smartphone or a 6DoF controller to place a virtual asset in a virtual world relative to the real world.

Referring now specifically to FIG. 2, in one exemplary embodiment, the app-directed process of the present disclosure first includes prompting the user 10 to place his or her smartphone 12 at a point 30 at which it is desired to spawn a virtual object 20 or around which it is desired to instantiate a virtual environment. Likewise, the user 10 could be prompted to place his or her 6DoF controller 13 at the point 30 at which it is desired to spawn the virtual object 20 or around which it is desired to instantiate the virtual environment. The camera of the smartphone 12 or 6DoF controller 13 should also be aligned such that a preferred orientation is indicated. For example, the camera of the smartphone 12 can be pointed along a desired axis of the virtual object 20. The result is a frame of reference, aligned with the real, in the virtual world that can subsequently be used to position and align virtual assets, as well as track their relative positions with respect to the user 10 as the smartphone 12 or 6DoF controller 13 is moved in the real world. This allows for optimal syncing of the real and virtual worlds, without the use of conventional ray casting and/or tethering. Advantageously, the smartphone 12 is still able to detect planes 14, such as the ground and the edges of surfaces, as before, and the 6DoF controller is still able to detect translational and rotational motions. Through the tools mentioned above, the smartphone 12 or 6DoF controller 13 is able to align the real and virtual worlds and spawn a virtual two-dimensional (2D) or 3D model or environment at or in relation to the selected point, thereby creating a more accurate immersive virtual experience, without the need for additional tools. Multiple datum points can be selected in this same manner, if desired.

It will be appreciated that, as used herein, "smartphone" broadly encompasses other handheld smart devices as well, such as tablets and the like, provided that they are AR-enabled. The app interface of the present disclosure is based on the AR/VR technologies provided above, and similar AR/VR technologies in existence and that may be developed. The app enables, through the selection of one or more datum points in the manner provided, a virtual coordinate correlated to a physical space, such that the app can subsequently track and correlate both translational and rotational information received from the smartphone 12 and/or 6DoF controller 13. An AR camera or controller GameObject is utilized by the app to track both translational and rotational information of the smartphone or 6DoF controller in space. In this sense, the smartphone 12 or 6DoF controller 13 acts as a virtual 3D cursor that can be utilized with natural position understanding, especially during an avatar or object spawning operation.

For smartphones 12, when the app is run on the supported device, a virtual coordinate system is created and correlated to the physical space with the initial requested point of the device's camera considered to be the origin.

For 6DoF controllers 13 or immersive headsets with 6DoF control, tracking functionalities are typically provided out of the box. It will be appreciated by persons of ordinary skill in the art that, as used herein, "6DoF controller" is intended to be used generically for any "multi-degree-of-freedom" mDoF controller, which may provide 6 or fewer degrees of freedom. For example, the use of an x-y-z controller is also contemplated.

Text or audio instructions are provided by the app to guide the user 10 through the placement and capture process. Once the user 10 interacts with the app interface (digital button on a 2D screen, physical button or trigger on a controller, or the like) to indicate that the camera or controller is stabilized at the desired point 30, data collection beings to capture a real time set of position/alignment data in relation to the virtual coordinate system for a short period of time, for example. A filtering algorithm is then optionally applied to the raw data in order to minimize error, if any, and an average result is optionally calculated. This process is repeated for all desired spawning points. Based on this capture result, a corresponding human avatar can be spawned and/or virtual objects can be placed in relation to the user 10 (e.g., a virtual steering wheel and dashboard may be placed in front of the user 10 and then manipulated in virtual space).

Figure 3:
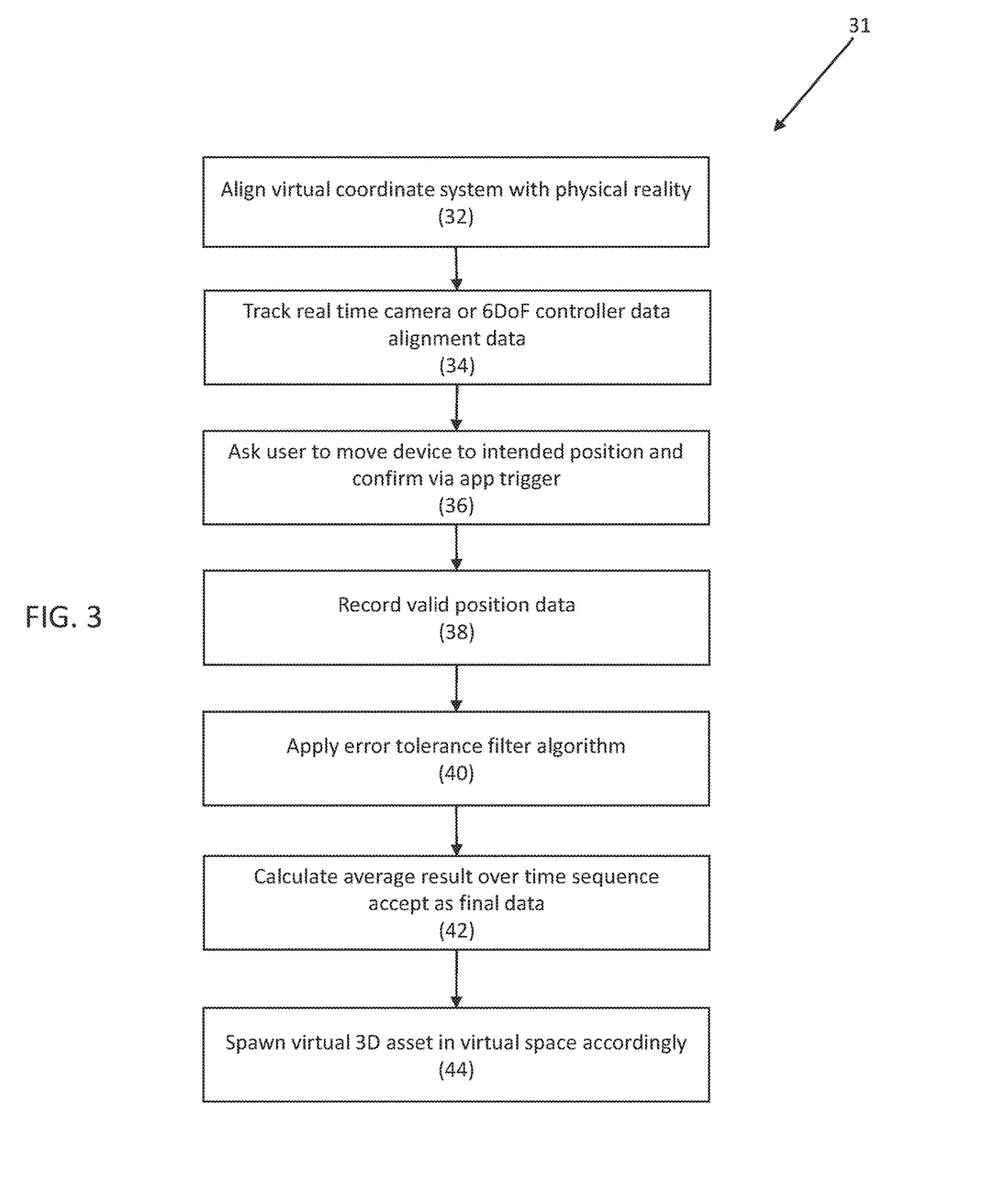
FIG. 3 is a flow diagram illustrating the operation of one exemplary embodiment of the AR/VR method of the present disclosure, highlighting the use of a smartphone or a 6DoF controller to place a virtual asset in a virtual world relative to the real world.

Referring now specifically to FIG. 3, in another exemplary embodiment, the AR/VR method 31 of the present disclosure includes first aligning a virtual coordinate system with a real world coordinate system 32, in general, and second tracking real time smartphone or 6DoF object position and alignment data 34, in general. These functionalities are inherently carried out using the tools mentioned above when executed on the smartphone and/or 6DoF controller. The app asks the user to move the device utilized to the target position and confirm such placement via an app triggering mechanism (app trigger), such as a swipe, button press, or written or voice command 36. Positioning can be corrected and re-triggered until accurate. Valid position and alignment data is then collected 38 by the app. Subsequently, an error tolerance filtering algorithm is then applied 40. This error tolerance filtering algorithm may consist of a basic thresholding algorithm, for example. Next, an average result over time or successive iterations may be calculated and stored as part of the final data result 42, when a time window is allowed for successive capture events, for example. This process is repeated for successive positions of interest. From the collected data points, object or environment alignment may then be reconstructed in virtual space, using the virtual coordinate system that now has a known relation to the real world coordinate system. Finally, a 3D asset can be spawned in virtual space, such as the virtual object or environment with the determined alignment 48.

Example 1: Aligning a Virtual Vehicle Around a Seated Real World User—Smartphone Referring now specifically to FIG. 4, in one exemplary embodiment, the app of the present disclosure is used to break out from a current user flow on a traditional web app or the like to an immersive AR/VR experience while seated, such as in a vehicle or the like. The user 10 is asked to follow a series of instructions while limiting extraneous motion to ensure accurate results. Specifically, the user 10 is asked to move the camera on his or her smartphone 12 around to obtain information about his or her real world surroundings. This can include translation in and rotation about the x, y, and z directions. The user 10 is asked to place his or her smartphone 12 at a point at which he or she would like to spawn a virtual object, such as a virtual steering wheel 50. For example, the smartphone 12 may be oriented sideways and held like a real world steering wheel, with its camera pointed away from the user 10. This provides an effective frame of reference for the spawned virtual steering wheel 50. The user 10 is asked to initiate action by clicking a button to start recording the associated transform information, with the camera enabling a spatial understanding of the real object in physical space transposed to the virtual object in virtual space.

Figure 4:
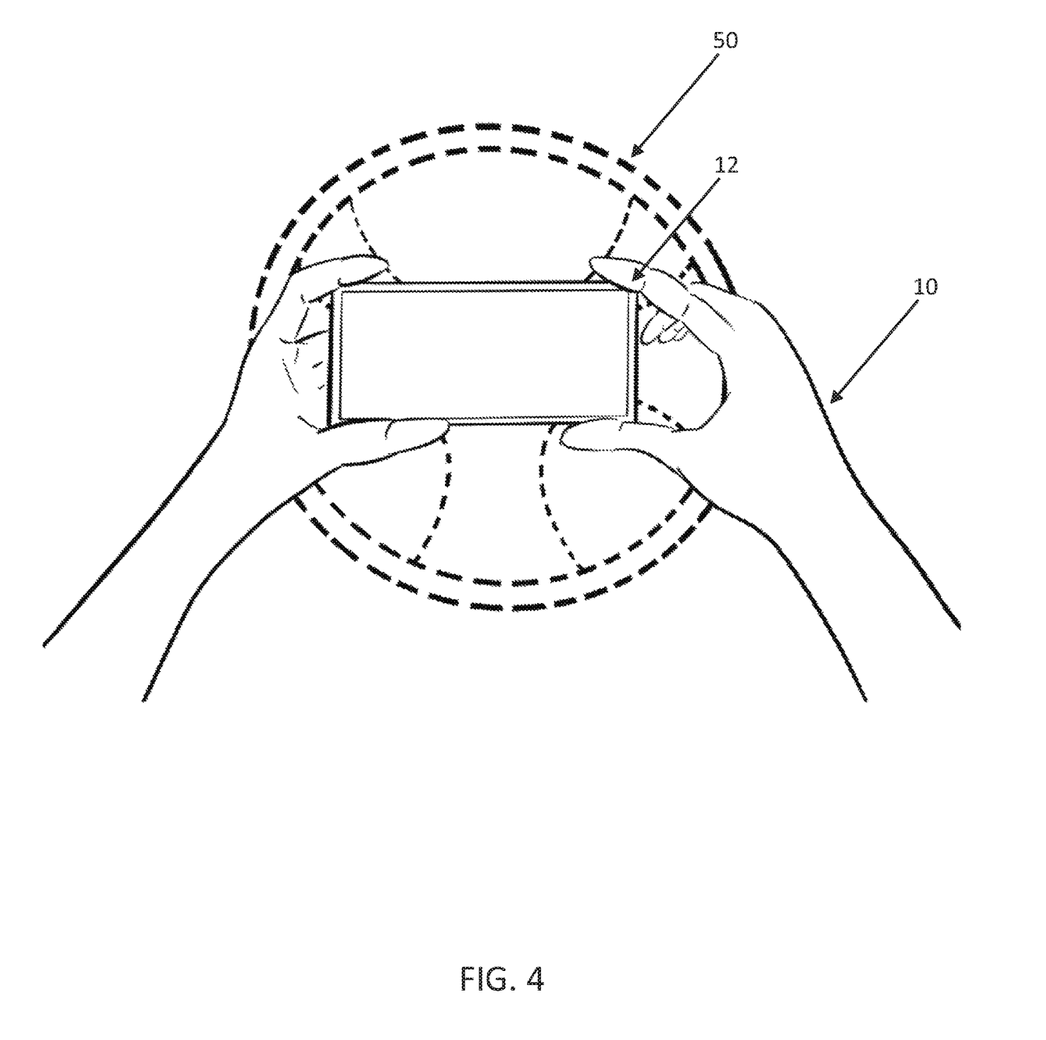
FIG. 4 is a schematic diagram illustrating the operation of one exemplary embodiment of the AR/VR app of the present disclosure, highlighting the use of a smartphone or a 6DoF controller to place a virtual asset in a virtual world relative to the real world, in this case a virtual steering wheel (and dashboard, vehicle, etc.) relative to a seated user/driver.

Here, the system collects information for a predetermined short period of time and calculates an average result from the collected data. This helps ensure greater accuracy and filters out the adverse effects of any unintended, unwanted motion. The user 10 is prompted to either redo the measurement, if required, or proceed to the next step, which may include the selection of additional spawning points and additional spawning alignments.

It should again be noted that, although a smartphone implementation is presented, a similar methodology can be carried out with a 6DoF controller or the like, provided that a frame of reference in both the real world and the AR world is available.

From the selected point(s) and indicated alignment(s), an avatar of the user 10 can be spawned in the AR world and/or a virtual object can be spawned in relation to the user 10 and/or an immersive environment can be spawned around the user 10, all with the proper orientation and relationship to the user 10 and taking full advantage of the user's natural position understanding.

Example 2: Aligning a Virtual Vehicle Around a Seated Real World User—6DoF Controller Again, the app of the present disclosure is used to break out from a current user flow on a web app or the like to an immersive AR/VR experience while seated, such as in a vehicle or the like. The user 10 (FIG. 3) is asked to follow a series of instructions while limiting extraneous motion to ensure accurate results. Specifically, the user 10 is asked to move the 6DoF controller 13 (FIG. 2) around to obtain information about his or her real world surroundings. This can include translation in and rotation about the x, y, and z directions. The user 10 is asked to place his or her 6DoF controller 13 at a point at which he or she would like to spawn a virtual object, such as a virtual steering wheel 50 (FIG. 3). For example, the 6DoF controller 13 may be oriented upright and held like a side portion of a real world steering wheel, with its axis pointed parallel to the user 10. This provides an effective frame of reference for the spawned virtual steering wheel 50. The user 10 is asked to initiate action by clicking a button to start recording the associated transform information, with the 6DoF controller 13 enabling a spatial understanding of the real object in physical space transposed to the virtual object in virtual space.

Here, the system collects information for a predetermined short period of time and calculates an average result from the collected data. This helps ensure greater accuracy and filters out the adverse effects of any unintended, unwanted motion. The user 10 is prompted to either redo the measurement, if required, or proceed to the next step, which may include the selection of additional spawning points and additional spawning alignments.

It should again be noted that, although a 6DoF controller implementation is presented, a similar methodology can be carried out with a smartphone or the like, provided that a frame of reference in both the real world and the AR world is available.

From the selected point(s) and indicated alignment(s), an avatar of the user 10 can be spawned in the AR world and/or a virtual object can be spawned in relation to the user 10 and/or an immersive environment can be spawned around the user 10, all with the proper orientation and relationship to the user 10 and taking full advantage of the user's natural position understanding.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted as one or more instructions or code on a computer-readable medium and executed by a hardware-based processing unit. Computer-readable media may include computer-readable storage media, which corresponds to tangible media, such as data storage media, or communication media, including any medium that facilitates transfer of a computer program from one place to another, e.g., according to a communication protocol. In this manner, computer-readable media generally may correspond to (1) a tangible computer-readable storage medium that is non-transitory or (2) a communication medium, such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can include random-access memory (RAM), read-only memory (ROM), electrically erasable-programmable read-only memory (EEPROM), compact disc read-only memory (CD-ROM) or other optical disc storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared (IR), radio frequency (RF), and microwave, then the coaxial cable, fiber optic cable, twisted pair, DSL, or wireless technologies, such as IR, RF, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Thus, the present disclosure utilizes existing AR/VR technologies, 3D development platforms, and 3D asset creation tools to establish a spatial correlation between the real world, the virtual world, and one or more virtual assets, especially at spawning, but subsequently as well. The present disclosure exploits the capabilities of an AR-enabled smartphone or other smart device, 6DoF controller associated with a VR headset, or the like. A user is prompted to select an instantiation point for a virtual asset using the device, essentially using it like a virtual 3D cursor—selecting where the virtual asset and surrounding virtual assets are spawned. The initial transformed relationships can then be maintained throughout the user's immersive experience. As a result, a personalized immersive environment and experiences can be provided with proper spatial orientation relative to the user—all taking advantage of the user's natural position understanding. Exemplary applications of this technology include virtual test drives, virtual vehicle feature tutorials, and the like.

Although the present disclosure is illustrated and described herein with reference to preferred embodiments and specific examples thereof, it will be readily apparent to persons of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A method of selecting an instantiation point for a virtual asset relative to a physical space, the method comprising:
   prompting a user to place a device at a desired position in the physical space corresponding to a desired position in a corresponding virtual space at which the user desires to spawn the virtual asset;
   capturing the position with respect to a real world frame of reference;
   translating the position with respect to the real world frame of reference to a frame of reference in the virtual space; and
   spawning the virtual asset in the virtual space at the translated position, such that the virtual asset spawned in the virtual space is present in a translated location in the virtual space that corresponds to a physical location in the physical space in which the device was previously placed by the user.

2. The method of claim 1, further comprising:
   prompting the user to place the device at the desired position in the physical space in a desired alignment corresponding to the desired position and a desired alignment in the corresponding virtual space at and in which the user desires to spawn the virtual asset;
   capturing the position and alignment with respect to the real world frame of reference;
   translating the position and alignment with respect to the real world frame of reference to the frame of reference in the virtual space; and
   spawning the virtual asset in the virtual space at the translated position and alignment, such that the virtual asset spawned in the virtual space is present in a translated location and orientation in the virtual space that corresponds to a physical location and orientation in the physical space in which the device was previously placed by the user.

3. The method of claim 1, wherein the device comprises one of a smartphone with a camera and a 6 degree-of-freedom controller.

4. The method of claim 3, wherein the prompting is performed by one of a mobile application executed on the smartphone and an application executed on a virtual headset.

5. The method of claim 1, wherein the capturing, translating, and spawning are performed by one or more of a mobile application executed on the smartphone, an application executed on a virtual headset, and a processor coupled to the device.

6. The method of claim 1, wherein capturing the position with respect to the real world frame of reference comprises taking a plurality of position measurements over a predetermined period of time and filtering the plurality of position measurements to obtain a final position measurement.

7. The method of claim 1, wherein capturing the position with respect to the real world frame of reference comprises taking a plurality of position measurements over a predetermined period of time and averaging the plurality of position measurements to obtain a final position measurement.

8. The method of claim 1, further comprising spawning one or more virtual assets around the virtual asset in the virtual space.

9. The method of claim 1, wherein the desired position in the physical space at which the device is placed corresponding to the desired position in the corresponding virtual space at which the user desires to spawn the virtual asset is an open position in the physical space not corresponding to a position in the physical space occupied by a physical asset corresponding to the virtual asset.

10. A non-transitory computer-readable medium stored in a memory and executed by a processor to select an instantiation point for a virtual asset relative to a physical space, the non-transitory computer-readable medium executing the steps comprising:
    prompting a user to place a device at a desired position in the physical space corresponding to a desired position in a corresponding virtual space at which the user desires to spawn the virtual asset;
    capturing the position with respect to a real world frame of reference;
    translating the position with respect to the real world frame of reference to a frame of reference in the virtual space; and
    spawning the virtual asset in the virtual space at the translated position, such that the virtual asset spawned in the virtual space is present in a translated location in the virtual space that corresponds to a physical location in the physical space in which the device was previously placed by the user.

11. The non-transitory computer-readable medium of claim 10, the steps further comprising:
    prompting the user to place the device at the desired position in the physical space in a desired alignment corresponding to the desired position and a desired alignment in the corresponding virtual space at and in which the user desires to spawn the virtual asset;
    capturing the position and alignment with respect to the real world frame of reference;
    translating the position and alignment with respect to the real world frame of reference to the frame of reference in the virtual space; and
    spawning the virtual asset in the virtual space at the translated position and alignment, such that the virtual asset spawned in the virtual space is present in a translated location and orientation in the virtual space that corresponds to a physical location and orientation in the physical space in which the device was previously placed by the user.

12. The non-transitory computer-readable medium of claim 10, wherein the device comprises one of a smartphone with a camera and a 6 degree-of-freedom controller.

13. The non-transitory computer-readable medium of claim 12, wherein the prompting is performed by one of a mobile application executed on the smartphone and an application executed on a virtual headset.

14. The non-transitory computer-readable medium of claim 10, wherein the capturing, translating, and spawning are performed by one or more of a mobile application executed on the smartphone, an application executed on a virtual headset, and a processor coupled to the device.

15. The non-transitory computer-readable medium of claim 10, wherein capturing the position with respect to the real world frame of reference comprises taking a plurality of position measurements over a predetermined period of time and filtering the plurality of position measurements to obtain a final position measurement.

16. The non-transitory computer-readable medium of claim 10, wherein capturing the position with respect to the real world frame of reference comprises taking a plurality of position measurements over a predetermined period of time and averaging the plurality of position measurements to obtain a final position measurement.

17. The non-transitory computer-readable medium of claim 10, the steps further comprising spawning one or more virtual assets around the virtual asset in the virtual space.

18. The non-transitory computer-readable medium of claim 10, wherein the desired position in the physical space at which the device is placed corresponding to the desired position in the corresponding virtual space at which the user desires to spawn the virtual asset is an open position in the physical space not corresponding to a position in the physical space occupied by a physical asset corresponding to the virtual asset.

19. A system for selecting an instantiation point for a virtual asset relative to a physical space, the system comprising:

a device executing an application operable for prompting a user to place the device or a coupled device at a desired position in the physical space corresponding to a desired position in a corresponding virtual space at which the user desires to spawn the virtual asset;

wherein the application is further operable for capturing the position with respect to a real world frame of reference;

wherein the application is further operable for translating the position with respect to the real world frame of reference to a frame of reference in the virtual space; and wherein the application is further operable for spawning the virtual asset in the virtual space at the translated position, such that the virtual asset spawned in the virtual space is present in a translated location in the virtual space that corresponds to a physical location in the physical space in which the device was previously placed by the user.

20. The system of claim 19, wherein the application is further operable for:

prompting the user to place the device at the desired position in the physical space in a desired alignment corresponding to the desired position and a desired alignment in the corresponding virtual space at and in which the user desires to spawn the virtual asset;

capturing the position and alignment with respect to the real world frame of reference;

translating the position and alignment with respect to the real world frame of reference to the frame of reference in the virtual space; and spawning the virtual asset in the virtual space at the translated position and alignment, such that the virtual asset spawned in the virtual space is present in a translated location and orientation in the virtual space that corresponds to a physical location and orientation in the physical space in which the device was previously placed by the user.

* * * * *